March 21, 1961
K. ECKARDT ET AL
2,975,871
VEHICLE BRAKING SYSTEM
Filed April 27, 1956
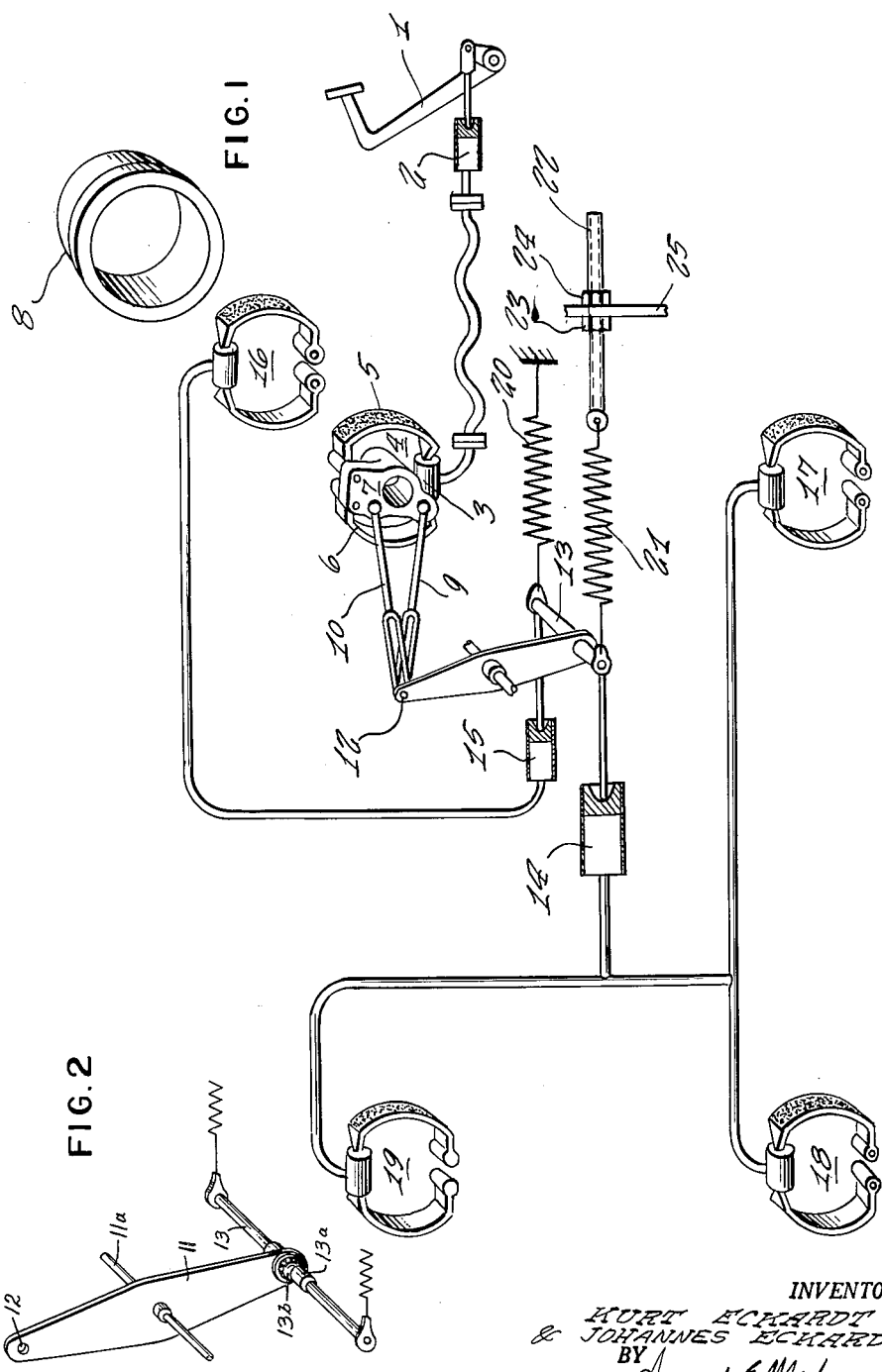
INVENTORS
KURT ECKARDT
& JOHANNES ECKARDT
BY
Armand E. Müller
Attorney United States Patent Office 2,975,871
Patented Mar. 21, 1961

2,975,871

VEHICLE BRAKING SYSTEM

Kurt Eckardt, Schwartze Strasse 17, and Johannes Eckardt, Lessing Strasse 13, both of Leipzig, Germany Filed Apr. 27, 1956, Ser. No. 581,059

7 Claims. (Cl. 188—140)

This invention relates to braking systems for motor vehicles and is directed particularly to an improved braking system of the type having auxiliary braking means for effecting operation of the main brakes.

The use of auxiliary brakes in braking systems for motor vehicles is well known. Such auxiliary brakes are so arranged that they are carried along with the brake drum when the brakes are applied. Through the momentum thus imparted to the auxiliary brake, the main brakes of the braking system are actuated. The characteristic difference between the main brakes and auxiliary brake is that the main brakes operate directly upon the framework of the vehicle with the least possible lost motion.

In the first prior art braking systems utilizing auxiliary brakes, the brake shoes were connected to provide additional operating pressure on the main brake shoes. However, none of these systems, even the so-called three-shoe servo brake, was successful. The greatest part of the theoretical advantage of servo brakes is countermanded by the greater actuating distance necessitated for moving the servo-mechanism brake shoes against each other. Moreover, the installation of such servo brakes so that all four wheels will be equally braked is extremely complicated. In such installations, it is usual for one wheel to be braked or locked before another, whereby the possibility of skidding upon application of the brakes is increased.

Subsequent braking systems utilized special auxiliary brake shoes or a single articulated shoe assembly that necessarily rotated upon braking, such as by being mounted for movement on a wheel or on the cardanic drive shaft of the vehicle. These auxiliary brakes were generally actuated at the same time as the main brakes, and their resultant momentum was applied to increase the braking force which the driver exerted on the brake pedal. Since the auxiliary brake first had to be moved before it could apply more or less pressure to the main brakes, its operation necessarily lagged operation of the brake pedal. In such systems, if the driver has effected a desired braking delay or action and wishes to maintain this braking action by keeping an even pressure on the brake pedal, the lagging of the auxiliary brake makes this impossible, since the counter-pressure on the brake pedal varies with constant braking action. This lack of correspondence between the braking action upon the vehicle and the braking strength needed to effect this action made braking difficult, to such an extent that these systems found limited application.

Finally, braking systems were devised wherein the driver actuated only the auxiliary brake, which alone, in turn, actuated the main brakes. The required brake-actuating force was derived in sufficient amount from the kinetic energy of the vehicle. However, none of these systems was found to be satisfactory because of additional unsolved difficulties. The braking force produced by the auxiliary brake for the main brakes was found to vary greatly, a fact which results in oscillations of the mechanism. The variations are caused by unevenness in the roadway, jolts while driving, jumping motion of the wheel having the auxiliary brake, and also by changes in the brake linings. Though these difficulties often ceased by themselves, temporarily, they cannot be eliminated for the reason that they depend upon the nature of the road and traffic conditions.

It is accordingly the principal object of our invention to provide an improved braking system for motor vehicles that overcomes the above-mentioned difficulties encountered in prior braking systems.

It is a more specific object of our invention to provide a braking system of the character described wherein the brake pedal controls the auxiliary brake only, wherein operation of the auxiliary brake causes actuation of the main brakes and wherein the auxiliary brake and one of the main brakes operate on the same wheel of the vehicle.

Other objects, advantages, and features of this invention will become apparent from the following description taken in conjunction with the drawing illustrating an embodiment of our invention by way of example. However, it should be understood that the description and the drawing are given by way of illustration and not of limitation and that many changes in the details can be made without departing from the spirit of the invention.

Fig. 1 is a schematic representation of the device according to the invention, and Fig. 2 is a perspective view of the balance lever employed in the device of Fig. 1.

Referring now in detail to the drawing, the invention comprises the use of an auxiliary brake assembly 4 having a pair of brake shoes 5 and 6 in association with one of the vehicle main brake assemblies 16, both of which are cooperative with the single brake drum 8 of the pertaining wheel, preferably a rear wheel of the vehicle. For clarity of illustration, the auxiliary brake assembly 4, the main brake 16 and the brake drum 8 are shown as an exploded view.

The spreading or back ends of brake shoes comprising the brake assemblies 4 and 16 are oppositely disposed. The brake shoes 5 and 6 are mounted on a carrier member 7, rotatably mounted with respect to the wheel axle, so that when the brake pedal 1 is actuated by the driver, hydraulic fluid is caused to flow from the master cylinder 2 into the auxiliary brake cylinder 3; this results in cooperative action of the brake shoes 5 and 6 with the brake drum 8, whereby the carrier member 7 will be imparted a momentum in the direction of the turning brake drum. The carrier member 7 is coperatively connected, by lost-motion link rods 9 and 10, to a pin 12 located at one end of a control lever 11. The control lever 11 is centrally pivoted or fulcrumed with respect to the car frame (not shown) on a shaft 11a, and has universally mounted in its other end an equalization balance lever 13. The control lever 11 is centrally pivoted or fulcrumed with respect to the car frame (not shown) on a shaft 11a, and has universally mounted in its other end an equalization balance lever 13. For this connection the balance lever 13 is provided with (as seen in Fig. 2), a ball in its center, secured to said balance lever. In the actuation lever 11, there are provided two ball sockets one of which is seen at 13a, and in which is received the ball of the balance lever. The ends of the equalization balance lever 13 are connected to operate main brake cylinders 14 and 15. Cylinder 15 operates the main brake assembly 16 associated with the auxiliary brake 4, and cylinder 14 operates the remaining three main brake assemblies 17, 18 and 19. The ends of the balance equalization lever 13 are also connected with respective return springs 20 and 21.

Since the auxiliary brake assembly 4 and the main brake 16 actuates the same vehicle wheel, the two brake assemblies are coupled together so rapidly that all differences with respect to their co-efficient of friction are smoothed out, and no oscillation during application of the brakes can result.

The return force of the spring 20 associated with the main brake 16 is weaker than the return force of spring 21 provided for the remaining main brake assemblies 17, 18 and 19. The graduation of braking effect thus produced results in the main brake 16 locking as the first main brake, and thus makes the wheel upon which the auxiliary brake assembly 4 and the main brake assembly 16 operate in common the leading wheel of the braking system. If now the driver should depress on the brake pedal 1 with greater force than allowable by the surface of the road, the leading wheel and auxiliary brake assembly 4 will lock. The other wheels of the vehicle, however, then operate upon the road surface to provide the greatest braking effect. This locking control has the following advantages: the leading wheel of the vehicle brakes without the vehicle skidding, even on glare ice or slippery asphalt. The leading wheel can thus produce any desired degree of braking. The upper limit for allowable delay of braking effect is determined alone by the co-efficient of friction obtaining at that instant on the surface over which the vehicle is traveling.

The return spring 21 is secured to a threaded rod 22 which can be adjustably positioned with respect to a stationary bracket 25 by means of adjustment nuts 23 and 24. The return force of the spring 21 with respect to that of spring 20 can thereby be adjusted to produce smooth and effective locking control even when changes occur in the co-efficient of friction of the brake linings during use. It will also be apparent that the auxiliary brake 4 actuates main brake assembly 16 by way of one arm of equalization lever 13, and main brake assemblies 17, 18 and 19 by way of the other arm of said lever. This renders the braking force of the main brake assembly 16 of the leading wheel of the braking system independent of the braking force of the remaining main brake assemblies 17, 18 and 19.

The springs 20 and 21 pull the lever 13 towards the right and weaken the actuation force provided by the auxiliary brake for the main brakes already in the mechanical part of force transfer. Thereby the hydraulic part of the same, leading from the main cylinders 14 and 15 to the main brakes 16, 17, 18 and 19, is relieved, which would not happen if these springs were only provided on the main brakes themselves.

It is to be noted that, besides simplifying construction, the arrangement whereby the ends of the brake shoes of the auxiliary brake assembly 4 and the associated main brake assembly 16 face in opposite directions, results in smooth braking action in the leading wheel. Applying the auxiliary brake assembly to one of the rear wheels has the further advantage that the steering action of the vehicle cannot be affected by braking.

It is to be understood that the embodiment of the invention described and illustrated herein is but one form of the invention. For example, though the braking system is illustrated as being a hydraulic system, it could as well be a mechanical system. It would also be possible to incorporate a braking force divider in the system as required when prolonged braking action is desired. In such a case the main brake assemblies 18 and 19 on the forward axle of the vehicle would of course be differently arranged. For the purposes of the invention, it is only important that the braking force divider receives the correct braking force from the auxiliary brake 4, as controlled by the leading braking wheel according to the road surface being travelled at the time.

It is essential to the invention that the main brake assemblies 16 and 17 not be actuated through the same arm of the equalizing balance lever 13 to the ends of which the respective return springs 20 and 21 are attached, and that at least these two counteracting springs operate on the equalizing balance lever. On the other hand, the particular positions of the return springs associated with the separate main brake assemblies, and the form of these springs, whether they be helical, leaf or torsion springs, or springs of rubber and the like, is unimportant to the invention. Thus, while we have shown and described a particular embodiment of the invention, it will be understood by those skilled in the art that the invention permits of various embodiments, modifications and uses other than those herein specifically described without departing from the essential features of the invention as set forth in the claims annexed hereto.

What we claim is:

1. In a braking system for automotive vehicles having first and second axles and at least one pair of wheels mounted on a first axle, the combination comprising a plurality of brake drums, each secured to each vehicle wheel for rotation therewith; a first main brake shoe assembly, arranged for co-action with one of said first brake drums on a first vehicle wheel of the first vehicle axle; an auxiliary brake shoe assembly, arranged in addition to said first main brake shoe for co-action with said first brake drum on the said first vehicle wheel of said first vehicle axle; a second main brake shoe assembly arranged for co-action with a second brake drum on a second vehicle wheel of said first vehicle axle; third and fourth main brake shoe assemblies arranged for co-action, each one with one of the other brake drums on the other vehicle wheels; a carrier member rotatably mounted with respect to the first axle securing said auxiliary brake shoe assembly rotatably to said first axle during its actuation, said auxiliary brake shoe assembly having a rotational moment upon actuation; means for actuating said auxiliary brake shoe assembly; means operatively connected to said carrier member for the transmission of the rotational moment of said auxiliary brake shoe assembly actuating said first, second, third and fourth main brake shoe assemblies in all vehicle wheels.

2. The braking system according to claim 1, in which the transmission means actuated by said auxiliary brake shoe assembly transmits portions of the actuation force made available by the rotation of said auxiliary brake shoe assembly to said first, second, third and fourth main brake shoe assemblies, said portions of the actuation force remaining always proportional to each other.

3. The braking system according to claim 2, wherein said auxiliary brake shoe assembly is arranged with its actuated ends substantially in a position opposite the actuated ends of the first main brake shoe assembly.

4. The braking system according to claim 3, wherein said auxiliary brake shoe assembly and said first main brake shoe assembly are arranged on a rear wheel of the vehicle.

5. The braking system according to claim 4, wherein said transmission means for said first, second and remaining brake assemblies comprises an actuation lever pivotally arranged on the vehicle; link means extending between said carrier members of the auxiliary brake shoe assembly and one end of the actuation lever and adapted to transmit the rotational moment of said auxiliary brake shoe assembly to said actuation lever; a balance lever universally arranged at the other end of said actuation lever; first actuation means for said first main brake shoe assembly connected with the first end of said balance lever; a first resilient return force mechanism extending between said first end of said balance lever and the vehicle; second actuation means for said second main brake assembly connected with the second end of said balance lever; and a second resilient return mechanism extending between the second end of said balance lever and the vehicle.

6. The braking system according to claim 5, wherein said first resilient return mechanism is weaker than said second resilient return mechanism.

7. The braking system according to claim 6, wherein at least one of the said resilient return mechanisms is adjustable.

References Cited in the file of this patent

UNITED STATES PATENTS

| | | |
|---|---|---|
| 2,147,082 | Beusch | Feb. 14, 1939 |
| 2,414,753 | Majneri | Jan. 21, 1947 |
| 2,737,265 | Cushman | Mar. 6, 1956 |

FOREIGN PATENTS

| | | |
|---|---|---|
| 725,907 | Great Britain | Mar. 9, 1955 |